May 19, 1970 W. L. BURLEY ET AL 3,513,290

AUTOMATICALLY HEATED ICE-CREAM SCOOP WITH STAND

Filed April 20, 1967 2 Sheets-Sheet 1

United States Patent Office 3,513,290
Patented May 19, 1970

3,513,290
AUTOMATICALLY HEATED ICE-CREAM SCOOP WITH STAND
Wallace L. Burley, Santa Ana, Calif. (Rte. 3, Box 141, Troutdale, Oreg. 97060), and Hrand M. Muncheryan, 1135 N. Morningside, Orange, Calif. 92667
Filed Apr. 20, 1967, Ser. No. 637,862
Int. Cl. A47j *43/28;* H05b *1/02*
U.S. Cl. 219—242
8 Claims

ABSTRACT OF THE DISCLOSURE

A cordless electrically heated ice-cream scoop is provided with a stand to horizontally support the scoop when not in use. The stand includes a receptacle for catching ice-cream drippings from the scoop. In one embodiment, the handle and the ladle of the scoop are provided with electric heating elements surrounded by a filling of granular heat-retaining electrical insulation material such as diatamaceous earth or mica flakes. The stand incorporates an electric outlet cooperating with terminals in the handle to transmit current to the heating element. A thermostat is provided in the handle to maintain the scoop at a desired temperature. In a second embodiment, only the ladle is electrically heated and the handle contains rechargeable batteries for supplying current to the heating means. The stand includes electric outlet means for recharging the batteries.

The present invention relates to ice-cream scoops and more particularly to an automatically heated ice-cream scoop provided with a detachable stand having a power outlet and means for catching the drippings of ice cream from said scoop when not in use and placed on said stand.

Conventional ice-cream scoops presently used in soda fountains and homes usually offer difficulty in discharging the ice cream after the scoop has been dipped several times into the bulk ice cream. The temperature of the scoop is so lowered that the ice cream freezes therein and sticks to the walls of the scoop. In some scoops, mechanical scraping blades are provided to discharge the ice cream from the scoop, but they also freeze and become difficult to operate and, at times, they break, defeating the purpose of such attachments. Other scoops are also available with heating elements or heated fluids such as oil, liquid wax, mercury and the like, but these also are unsatisfactory in operation because of leakage of the fluids from wear of the device at the seals, contaminating the ice cream. As for the use of mercury as the heat sustaining element, which is very fluid and has low vapor pressure, when it leaks out and mixes with ice cream, it will cause dangerous consequences because of its poisonous character.

Overcoming these difficulties and deleterious effects of liquid-filled scoops, the present invention is designed to eliminate these troublesome problems by offering a simple-construction, efficient, durable, and practicable device for scooping and dispensing ice cream. The invention is provided with an adjustable temperature control to sustain the ladle of the scoop at a relatively uniform temperature. This function is further aided by filling the handle of the scoop and the space intermediate to the heating elements with a thermally conductive and electrically insulating inert substance such as flakes of mica or granules of diatomaceous earth, which cannot be spilled or leak out of the scoop and further is not harmful as mercury or mineral oil stated in earlier patents. Furthermore, the invention is provided with a stand which serves to support the scoop in a horizontal position to prevent the ice-cream drippings from the ladle from reaching the electric socket, causing a dangerous short circuit, as would be prevalent in any stand which supports the ice-cream scoop in a vertical position. In addition, the stand receives and transmits heating current to the scoop from an ordinary 115-volt household power source.

The principal object of the invention is to provide an ice-cream scoop which is automatically heated to a predetermined temperature and is adapted to retain that temperature during use, thus facilitating the discharge of the ice-cream from the scoop.

A further object of the invention is to provide an automatic control means for adjusting the current which heats the scoop and thereby sustaining the temperature constant within reasonable tolerances.

Another object of the invention is to provide a thermo-conductive current-insulating solid matter within the scoop capable of heating and retaining heat for long periods of time.

A further object of the invention is to provide a stand having incorporated therein an electrical outlet means which serves to furnish current to the heating elements of the scoop as well as to support the scoop in a horizontal position when not in use, whereby the ice-cream drippings therefrom can be collected in a removable receptacle provided in the stand.

A still further object in an alternate embodiment of the invention is to provide a scoop of the character having a self-contained electrical heating source which can be recharged from an ordinary 115-volt household current after its power is consumed in the heating elements.

Another object in the alternate embodiment of the invention is to provide a pushbutton switch on the scoop having self-contained current source in which the current can be turned on and off as desired for heating the ice-cream scoop.

Other objects and advantages of the invention will become better understood hereinafter from a consideration of the specification with reference to the accompanying drawings forming part thereof, and in which like numerals correspond to like parts throughout the several views of the invention, and wherein.

Figure 1:
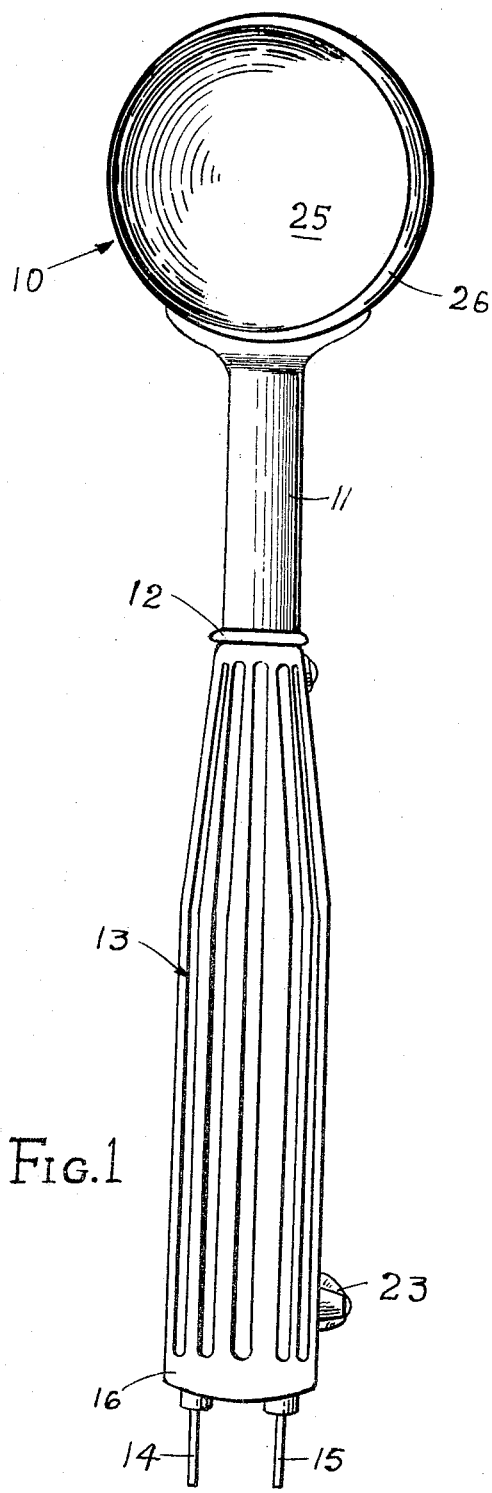
FIG. 1 is a front view of the invention in elevation.
Figure 2:
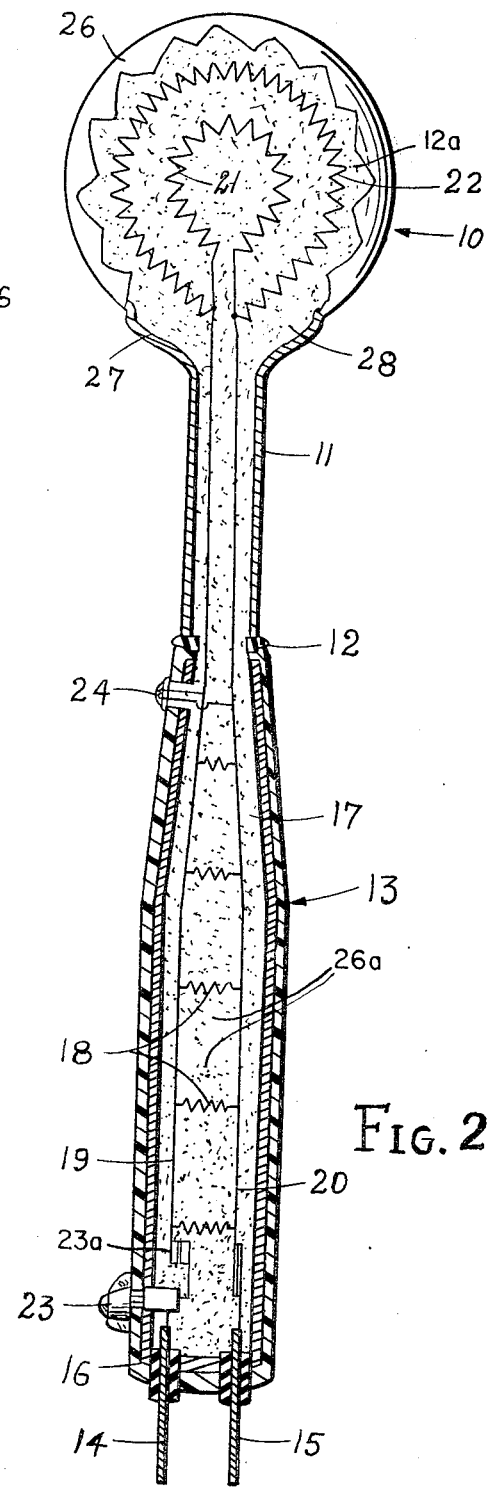
FIG. 2 is a vertical sectional view of the ice-cream scoop, with a cutaway section showing the back side of the scoop, the heating elements, and the related parts.
Figure 3:
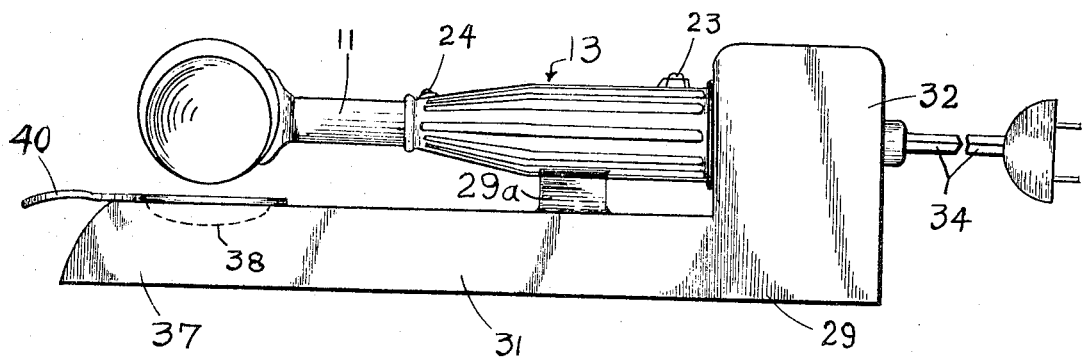
Figure 4:
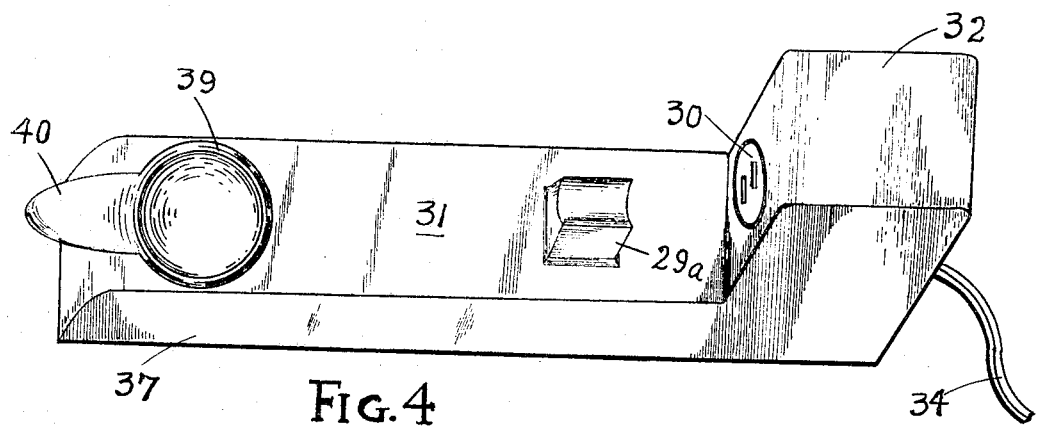
Figure 5:
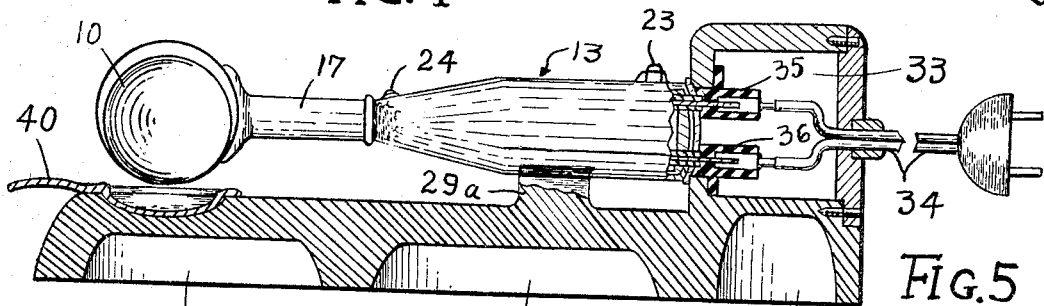
Figure 6:
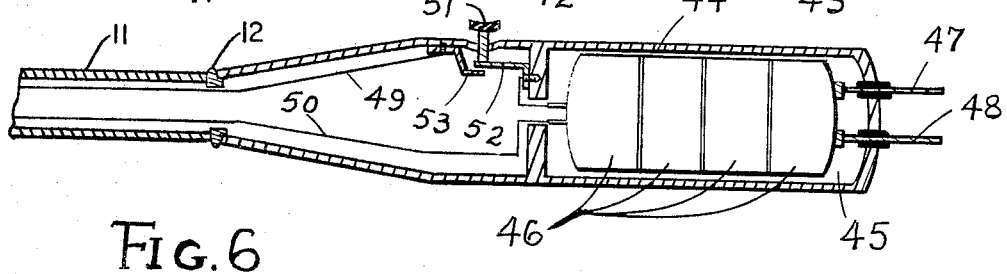

FIG. 3 is a side perspective view of the ice-cream scoop mounted in normal resting position in the stand provided with a current outlet box, FIG. 4 is a top view of the stand, with the scoop removed to show the electrical outlet plug and the receptacle for ice-cream drippings, FIG. 5 shows the ice-cream scoop with the stand in the same position as that in FIG. 3, but with a sectional portion to show details of the power outlet box, base construction of the stand, and the removable receptacle, and FIG. 6 is a modified embodiment of the invention in longitudinal sectional view, showing the arrangement of the self-contained power supply and the current control switch, the ice-cream scooping portion being the same as that shown in FIGS. 1 and 2 and left out for space restriction on the drawing.

Referring to the drawing, the improved ice-cream scoop characterizing the present invention comprises a concave double-walled hemispherical member or scoop section 10 for scooping and dispensing ice cream and having a tubular extension 11 terminating in an annular flange 12 which is secured to a supporting grip section or handle 13. Electrical prongs 14 and 15 are attached to the terminal end 16 of said handle 13 to receive and supply current thereto. A chamber 12a is formed in said double-walled scoop section 10 and is continuous with chamber 17 formed within the tubular section 11 and the handle 13, wherein is disposed a plurality of heating elements 18 connected in parallel in the circuit formed by conductors 19 and 20 supplied with electric current through prongs 14 and 15. The conductors 19 and 20 are continuous with additional heating elements 21 and 22 located in the hemispherical member or scoop 10. A variable thermostatic control 23 is connected in the circuit of the conductor 19 (or 20) to adjust the current therein and thereby the temperature of chambers 17 and 12a. The numeral 23a is the thermosensitive element of the thermostatic control 23. When the current is on, a red light from lamp 24 is on, indicating the scoop is heating; when the scoop 10 is heated to a temperature set by the variable-temperature control thermostat 23, the light of lamp 24 is off. Thus the scoop is continuously energized as long as it is in the stand except when the thermostatic element 23a opens the circuit therein.

The conductors 19 and 20 and the heating elements 18, 21, and 22 are covered with an electric insulator, such as asbestos. The heating elements 21 and 22 are sandwiched between a front cup 25 and an outer or rear cup 26 of the scoop 10 and are electrically insulated therefrom by their insulating sheaths and by means of the thermoconductive insulation material 26a surrounding the heating elements. The peripheries of the cups 25 and 26 are sealed as by welding or by other suitable means; the cups 25 and 26 are further welded to a supporting conical flange 27 of tubular extension 11. The space between the electric heating elements and the surrounding walls is filled with a thermoconductive and insulating material 26a, such as granules of diatomaceous earth and flakes of mica or similar material, to retain the heat evolved within the chambers 17 and 28. The electrically insulating thermoconductive material 26a is represented by dots in FIG. 2.

When the ice-cream scoop is not in use, it is normally placed on its rack 29, by inserting the electrical outlet prongs 14 and 15 into the outlet socket 30 (FIG. 4) provided in the rack 29 and supporting on a saddlelike projection 29a formed thereon. The rack 29 comprises a flat extended section 31, adapted to be supported on a horizontal surface, and a boxlike electric outlet section 32 containing a chamber 33 (FIG. 5) wherein an electric outlet cord 34 makes connections to split bus bars 35 and 36, which form the contacts of socket 30 and provide mechanical support to prongs 14 and 15. The flat extended section 31 contains at its terminal portion 37 a circular depression 38 wherein is disposed a removable pan or receptacle 39 for catching ice-cream drippings from the hemispherical scoop member 10 of the ice-cream scoop.

The pan 39 is provided with an elongated flange 40 used for holding the pan during disposing of the ice-cream drippings, or during washing the pan. By supporting the ice-cream scoop in a horizontal position as shown in FIG. 3 or FIG. 5, the handle 13 of the scoop and its associated parts do not become contaminated with ice-cream drippings, which also may short-circuit the current in the event the drippings reach the outlet contacts or bus bars 35 or 36 of the current source were the ice-cream scoop held in a vertical position in an electric socket. The openings 41, 42, and 43 in the undersurface of rack 29 are for reducing the weight thereof and saving material of construction.

In operation, the scoop is placed on the stand or rack 29, with the prongs 14 and 15 inserted into the outlet socket 30. The alternating current from the external source enters the scoop through the prongs 14 and 15, and begins to heat the elements 18, 20, and 21. The indicating light 24 comes on and remains "on" until the ladle part 26 of the scoop heats, whereupon the light of indicator 24 goes off. The ice-cream scoop is now ready for scooping ice cream.

In the modified embodiment shown in FIG. 6, the invention comprises a handle 44 having therein a chamber 45 containing rechargeable batteries 46 provided with contact prongs 47 and 48 to receive current from an outside source, such as from a 115-volt household circuit; the household current usually being alternating, it is rectified before it is applied to recharge the batteries. The batteries 46 are preferably connected in parallel and furnish heating current through conductors 49 and 50 to the heating elements (not shown). The conductors 49 and 50 are similar to elements 21 and 22. A cutoff switch 51 is connected in series with the conductors 49 and 50 and is used to turn the current on as needed, by pressing thereon. The switch 51 is normally at open position and when depressed the resilient contact 52 makes an electrical contact with its mating contact stub 53, which action turns on the current. When not in use, the scoop is supported on the rack 29 in the same manner as the scoop illustrated in FIG. 3. This action causes the batteries 46 to recharge if their charge has been consumed to a level below their normal charge. When the batteries 46 are fully charged, they are automatically cut off from the external current source; the mechanism of the automatic current cutoff is not shown because the commercially sold rechargeable batteries are provided with such a mechanism.

Having thus described the invention, it is to be understood that certain modifications in the construction and arrangement of the parts thereof will be made, as deemed necessary, without departing from the scope of the appended claims.

We claim:

1. An automatically heated ice-cream scoop with stand, comprising the combination of an elongated hollow handle having at one end thereof a hollow concave double-walled hemispherical means adapted to receive and dispense ice cream and at the other end electric conductor means for detachable connection to a source of electric current, electric heating elements positioned axially in said elongated handle and extending into the space within said hollow concave double-walled hemispherical means, means disposed in said handle for receiving and supplying electric current to said heating elements to heat said double-walled hemispherical means, a series-connected means in the circuit of said electric heating elements to control said electric current to said elements, and a stand means comprising a horizontal, flat section with an electric current outlet box disposed at one end thereof having electric inlet and outlet means, said inlet means being connected to an external source of current and said outlet means being detachably connected to said electric conductor means for transmitting current thereto; a continuous chamber formed within said handle and extending into said hollow concave double-walled hemispherical means and an electrically insulating thermoconductive material being disposed therein to fill the spaces surrounding said electric heater elements; said flat section of said stand means having thereon first means adapted to support said ice-cream scoop in a horizontal position and in parallel relation to said flat section of said stand means, and a second means disposed in said flat section for collecting ice-cream drippings from said double-walled hemispherical means when said scoop is positioned horizontally on said stand means with said electric conductor means on said handle of said scoop inserted into said outlet means in said electric current outlet box.

2. An automatically heated ice-cream scoop with stand as defined in claim 1, wherein said electric conductor means comprises a pair of metal prongs secured to the end of said handle, said means in said handle for receiving and supplying electric current to said heating elements comprising insulated electric wires extending from said prongs into said continuous chamber in said handle and connected to said electric heating elements to supply heating current thereto.

3. An automatically heated ice-cream scoop with stand as defined in claim 1, wherein said means disposed in said handle for receiving and supplying current to said electric heating elements is a pair of electric conductors provided with said electric heating elements therebetween and connected in parallel thereto.

4. An automatically heated ice-cream scoop with stand as defined in claim 1, wherein said series-connected means is a variable temperature-control thermostat for maintaining the temperature of said ice-cream scoop at a predetermined level.

5. An automatically heated ice-cream scoop as defined in claim 1, wherein said series connected means is a thermostat disposed in the circuit of said heating elements and is further connected in series with an indicator lamp disposed in the wall of said handle of said scoop, said thermostat opens the circuit of said heating elements and turns off the light of the indicator lamp when the scoop is heated to the temperature set by said thermostat, thus indicating that the ice-cream scoop is ready for the next operation.

6. An automatically heated ice-cream scoop with stand as defined in claim 1, wherein said first means on the flat section having the electric current outlet box is a saddle-like projection formed thereon in remote relation to said electric current outlet box, said saddle-like projection being provided with means to accommodate the handle of said scoop and to support said double-walled hemispherical means of said scoop in spaced and superior relation to said second means for collecting ice-cream drippings from said double-walled hemispherical means.

7. An automatically heated ice-cream scoop with stand as defined in claim 1, wherein said flat section of said stand means is provided adjacent the terminal portion of said flat section with a circular depression formed in the upper surface of said flat section, and wherein said second means for collecting ice-cream drippings is a receptacle adapted to be accommodated in said circular depression in removable relation thereto, said receptacle having a handle for removal of said receptacle from said circular depression.

8. An article of manufacture, comprising in combination an ice-cream scoop, a stand for holding said scoop in a horizontal position, and an electric outlet box having an electric cord to transmit current thereto from an external source being formed at one end of said stand; said ice-cream scoop having a double-walled ladle and an elongated handle secured to said ladle for manipulation thereof; said handle having a chamber axially formed therein; electric heating elements disposed within said chamber and extending into the space within said double-walled ladle and to the terminal end of said elongated handle, which latter end being closed and a pair of electric inlet prongs being secured therein and connected to said heating elements for transmitting heating current thereto; thermosensitive means connected in the circuit of said heating elements to control the current therein and thereby the temperature of said double-walled ladle; and, an electrically insulating thermoconductive heat storage material being disposed around the heating elements within said scoop and in said handle; said stand having a flat base section adapted to be placed on a horizontal surface and said electric outlet box formed at one end of said stand having an electric outlet socket means positioned at right angles to the top surface of said base section and electrically connected to the circuit of said electric cord; said socket means being adapted to accommodate said inlet prongs at the end of said elongated handle to transmit to said prongs electric current from said electric cord; said flat base section having a support means formed thereon for holding said scoop in a horizontal position when not in use, and a concave area formed adjacent the terminal end of said base section with a removable pan disposed therein to catch the drippings of ice cream from said scoop when mounted on said support means with said inlet prongs inserted into said electric outlet socket.

References Cited

UNITED STATES PATENTS

| | | | |
|---|---|---|---|
| 1,323,523 | 12/1919 | Cox | 107—48 |
| 1,971,577 | 8/1934 | Parker | 107—48 |
| 2,166,810 | 7/1939 | Gammeter | 219—242 |
| 2,256,770 | 9/1941 | Armstrong | 107—48 |
| 2,323,296 | 7/1943 | Brown | 248—37.3 |
| 3,293,528 | 12/1966 | Rosen et al. | 320—2 |
| 3,419,704 | 12/1968 | Hunt | 219—240 X |

ANTHONY BARTIS, Primary Examiner

U.S. Cl. X.R.

107—48; 219—227, 240, 241; 248—37.3; 320—2